Figure 1:
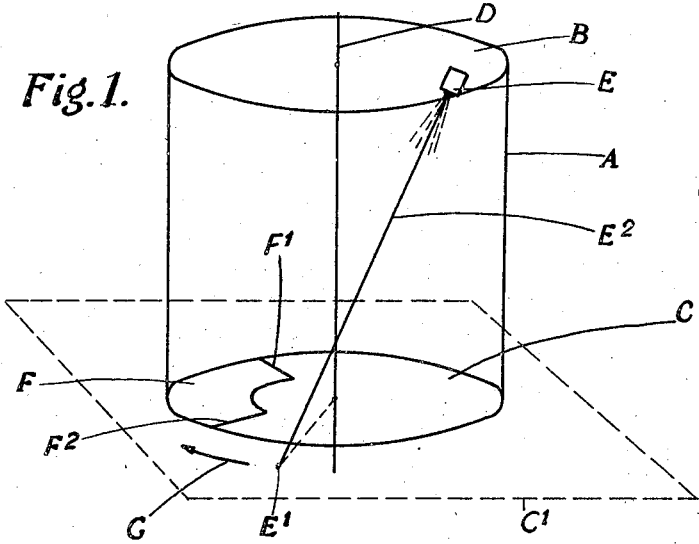

April 14, 1936.  H. R. RICARDO  2,037,339

INTERNAL COMBUSTION ENGINE OF THE LIQUID FUEL INJECTION TYPE

Filed May 15, 1935  2 Sheets-Sheet 1

Inventor
Harry R. Ricardo
By Watson, Cait, Morse & Grindle
Att'ys

April 14, 1936.    H. R. RICARDO    2,037,339
INTERNAL COMBUSTION ENGINE OF THE LIQUID FUEL INJECTION TYPE
Filed May 15, 1935    2 Sheets-Sheet 2

Inventor
Harry R. Ricardo
By Watson, Coit, Morse & Grindle
Att'ys

Patented Apr. 14, 1936

2,037,339

UNITED STATES PATENT OFFICE 2,037,339

INTERNAL COMBUSTION ENGINE OF THE LIQUID FUEL INJECTION TYPE

Harry Ralph Ricardo, Pall Mall, London, England

Application May 15, 1935, Serial No. 21,665
In Great Britain May 16, 1934

1 Claim. (Cl. 123—32)

This invention relates to internal combustion engines of the liquid fuel injection compression ignition class having a combustion chamber pocket communicating with the cylinder by a restricted passage, the pocket and the passageway thereto constituting the major portion of the compression space of the engine at the end of the compression stroke, a fuel sprayer being mounted in the wall of the pocket and injecting fuel into an air charge forced into the pocket during the compression stroke, and has for its object to provide an improved engine of the above kind.

The improvements embodied in the present invention may be taken as relating for example to the engine of the above class which forms the subject of the present inventor's U. S. A. patent application Serial No. 724,583. That engine comprises a combustion chamber formed as a pocket which lies outside of but communicates with the cylinder bore by a throat or passageway situated in or leading into a part of the pocket adjacent to the cylinder bore, the formation of the pocket being such as to provide a combustion chamber having an approximately circular cross-section about an axis and end walls the minimum distance between which is at least two thirds of the mean diameter of the combustion chamber, while the throat or passageway is formed so that the air charge forced therethrough during the compression stroke will enter the combustion chamber in a direction such that the charge in the combustion chamber at the end of the compression stroke will be in a state of rotation as a whole about the said axis, and a fuel injection device mounted in the wall of the pocket at a point displaced from the axis and adapted to deliver into the combustion chamber a jet or jets of fuel the mean direction of which is either parallel to or makes an angle of less than 45° with a line parallel to the said axis.

In an engine of the general class indicated above according to the present invention the axis of the fuel jet meets the "floor plane" of the combustion chamber pocket at a point which may be designated the jet end point, which lies between radial planes extending from the combustion chamber axis and angularly positioned about that axis respectively 15° and 135° in a direction measured upstream from the radial plane which extends from the combustion chamber axis and passes through the downstream edge, as hereinafter defined, of the actual or "equivalent" orifice of the throat or passageway, the said jet end point being displaced in a radial direction from the combustion chamber axis by a distance greater than one third of the mean of radii drawn from that axis to the inner surface of the combustion chamber.

If the fuel jet axis is not parallel to the combustion chamber axis, the direction in which the jet axis is inclined relatively to the chamber axis may be radially inwards or circumferentially, but in the latter case is in the downstream direction. This jet axis inclination may be in a direction compounded of radial and circumferential. In any case the position of the jet end point in relation to the combustion chamber axis should be not less than one third of the combustion chamber mean radius as measured from the chamber axis.

The "floor" of the combustion chamber is regarded as that end or end part of the chamber which lies remote from the fuel injection device and through which end or end part passes the axis of the chamber. The expression "floor plane" is employed as designating the plane at right angles to the combustion chamber axis in which plane will lie the floor of the combustion chamber if it is formed flat, or that similar plane in which, if the actual "floor" is curved, would be located a flat floor which would give to the combustion chamber a volume equal to that of the chamber with the curved floor. The expressions "upstream" and "downstream" are used in relation to and as designating respectively against or with the direction of rotation of the air charge in the chamber after this charge has entered the chamber from the throat or passageway and before that air charge again reaches the orifice of that passageway. The expression "equivalent orifice" is employed as indicating an imaginary orifice of quadrilateral shape having certain characteristics indicated hereunder which would enable this imaginary orifice to be substituted for the actual orifice of the throat or passageway in the combustion chamber. The contour of such an "equivalent" orifice may be employed where the actual throat orifice has not a suitable quadrilateral contour to permit of readily determining therefrom the directioning of the fuel jet in accordance with the present invention.

The invention may be carried into practice in various ways more especially with respect to the shape or internal contour of the combustion chamber and the directioning of the fuel jet axis suitable for such combustion chamber, but within the limits or definitions indicated above and as more particularly described hereunder and irrespective of the location of the combustion chamber in relation to the cylinder, the detail formation of that chamber and of the throat or passageway leading from the cylinder into that chamber.

The accompanying drawings and following description indicate by way of example and diagrammatically a construction that may be adopted in carrying the invention into practice.

In these drawings—

Figure 2:
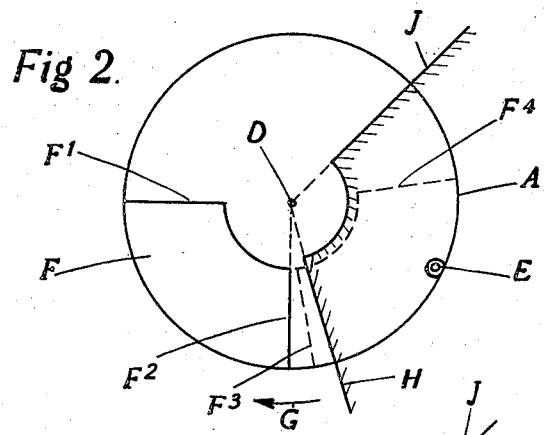
Figure 3:
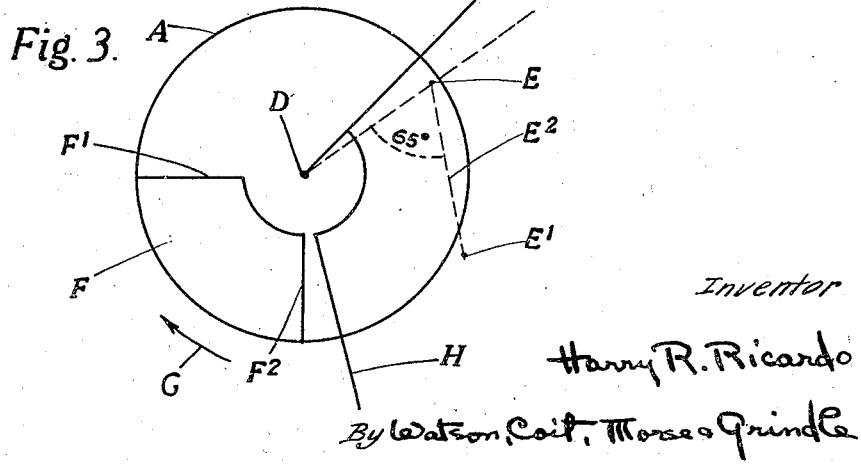
Figure 4:
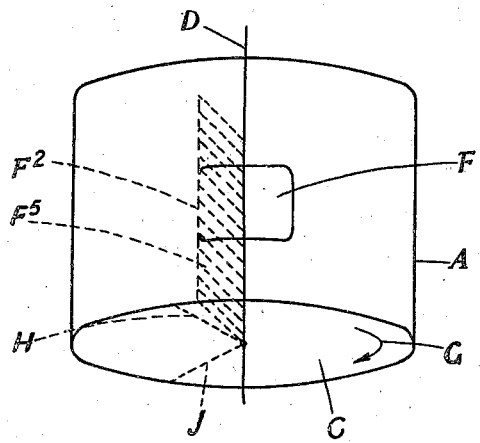
Figure 5:
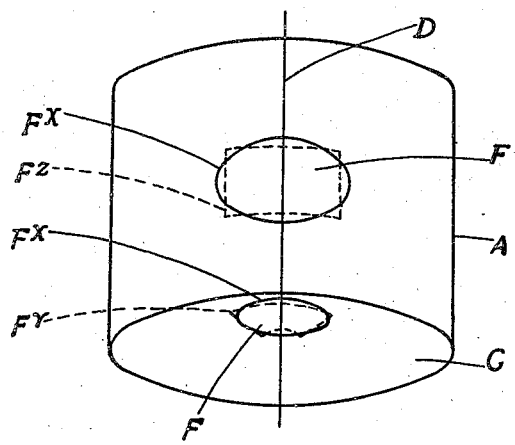

Figure 1 is a diagrammatic elevation of a combustion chamber illustrating in perspective the directioning of the fuel jet in accordance with this invention, Figure 2 is a diagrammatic plan based on Figure 1 and illustrative of the general features of the invention, Figure 3 is a diagrammatic plan similar to Figure 2 showing a preferred arrangement of the position of the jet nozzle and the directioning of the jet of fuel therefrom, Figure 4 is a diagram illustrative of a feature associated with the directioning of the jet in the case where the orifice of the throat or passageway is situated in the side wall of the combustion chamber, and Figure 5 is a diagram illustrative of the expression "equivalent orifice" as hereinafter used in connection with what are designated the downstream and upstream radial edges of the orifice in the combustion chamber of the throat or passageway leading into that chamber.

Referring more particularly to Figure 1, let it be supposed that the combustion chamber A is internally of cylindrical shape with flat ends B and C lying in planes at right angles to the axis D of the chamber. In what may be referred to as the inner end B is mounted the fuel jet nozzle E, while in what may be called the outer end C, which constitutes what has been referred to as the "floor" of the combustion chamber, is the orifice F at the inner end of the passageway leading into the combustion chamber. The passageway may lead through a plug forming this end or part of the chamber. The shape and dimensions of this orifice may vary but the general direction of the passageway is such as to cause the air charge forced therethrough into the combustion chamber to rotate in the latter in a direction, indicated by the arrow G, which for convenience in the present instance may be assumed to be and designated as clockwise about the chamber axis D when the chamber is viewed in plan, that is to say looking down from the inner end towards the floor C and as seen in Figures 2 and 3. If this floor is formed flat as is supposed in the present instance, it is coincident with the "floor plane", which is indicated in Figure 1 by the area enclosed by the dotted lines $C^1$. The minimum distance between the inner end B of the combustion chamber and the floor C is at least two thirds of the mean diameter of the chamber.

What may be designated the upstream edge of the passageway orifice F in the chamber is that edge $F^1$ over which, when the floor of the chamber is viewed in plan, the inflowing stream of the air charge passes first as it commences its rotation in the chamber. The downstream edge of the passageway orifice is then that edge $F^2$ over which the air stream will flow after its rotation within the cylindrical chamber past the jet of fuel as it again enters the passageway on its way into the cylinder. This orifice F considered as a whole lies adjacent to the side or cylindrical wall A of the chamber and is not of such dimensions as to extend along a radius inwards right up to the chamber axis, stopping appreciably short of that axis. For convenience in the present instance as shown in Figures 1, 2 and 3, the downstream edge $F^2$ of this orifice may be regarded as a straight line extending along a radius from the chamber axis D. If, however, this edge of the actual orifice in the combustion chamber is not straight and radial but is curved, as it may be, then for the purpose of this invention and for determining the jet directioning, reference may be made to an imaginary "equivalent" orifice. This "equivalent" orifice will have its downstream edge straight and it will lie in a plane extending radially from the combustion chamber axis.

The orifice of the passageway at the cylinder end thereof is diagrammatically shown in Figure 2 by the dotted radial lines $F^3$, $F^4$, thus indicating the general inclination of the passageway which causes the rotational movement of the air charge entering the combustion chamber.

Planes radial to the chamber axis are assumed and represented in Figures 2 and 3 as lines drawn on the "floor plane", one of such planes H being angularly distant 15° in the upstream direction from the downstream radial edge $F^2$ of the orifice F while another plane J is 135° from that edge. These radial planes H and J delimit on the "floor plane" as seen in Figure 2 an arc which may be designated the "permissible zone" within which in accordance with this invention may lie the jet end point $E^1$ (see Figure 1), that is to say the point where the jet axis $E^2$ will meet the "floor plane". This end point may lie either within or without the contour or boundary line of the side wall A of the combustion chamber when viewed in plan.

The fuel jet nozzle E is positioned in the inner end B of the combustion chamber, a substantial distance from the chamber axis D and preferably adjacent to its side wall A, this position being such that if the jet axis $E^2$ extends parallel to the chamber axis the jet nozzle E, when the structure is viewed in plan, as in Figure 2, will naturally lie within the permissible zone, that is between the radial planes H and J, so that the jet end points $E^1$ may lie within this zone. If, however, the jet axis $E^2$ is inclined with respect to the combustion chamber axis D, the jet nozzle E may be positioned outside the permissible zone in the upstream direction, that is beyond the radial plane J, but so that the jet end point $E^1$ will lie within the permissible zone.

A preferred position for the jet nozzle E, if the jet axis $E^2$ lies parallel to the combustion chamber axis, is distant about 70° in the upstream direction from the passageway orifice downstream radial edge $F^2$. The radial position of the jet nozzle from the axis D may then be approximately 0.07 of the combustion chamber mean diameter measuring in the radially inward direction from the chamber side wall A as its mean contour is viewed in plan.

If the jet axis $E^2$ is inclined to the combustion chamber axis, this inclination may be of the order of 30°. In a preferred arrangement as shown in Figure 3 the fuel jet nozzle E is positioned on a radius from the combustion chamber axis D which is 125° from the radial plane in which lies the downstream radial edge $F^2$ of the passageway orifice. The inclination of the jet axis $E^2$ may be such that when viewed in plan this axis will lie at an angle of 65° measured about the fuel jet nozzle E from a line drawn from the combustion chamber axis D through the fuel jet nozzle. If the combustion chamber is cylindrical and has a length between its inner end B and its outer end C equal to its diameter, the jet end point E¹ will then be found to lie within the permissible zone on the "floor plane", but just outside the circle A defining the contour of the combustion chamber side wall.

It is to be understood that if a plug member is provided through which runs the throat or passageway, this member forms a part of the wall which constitutes for example the outer end C or end portion of the combustion chamber, but the plug may form a substantial part of the side wall of the combustion chamber and a part or the whole of the end C of the latter.

In some cases it is desirable to arrange the throat orifice F in the side wall A of the combustion chamber, for example, as indicated diagrammatically in Figure 4. In such an arrangement, the directioning of the fuel jet axis is determined in relation to a plane indicated at F⁵ as extending radially from the chamber axis D in which plane lies the downstream edge F² of the actual or "equivalent" throat orifice.

With regard to the imaginary "equivalent" orifice above referred to, this is indicated by way of example in Figure 5 in relation to actual orifice forms that may be employed in practice. In this figure is shown for example first an actual orifice F˟ of oval contour situated in the floor C of the combustion chamber, this floor being represented in the diagram as flat. The imaginary "equivalent" orifice of quadrilateral shape is indicated at Fʸ in dotted lines, this "equivalent" orifice being quadrantal with its upstream and downstream edges radial with respect to the combustion chamber axis D and its other two sides or edges lying on concentric circles struck from this axis. The diagram Figure 5 also shows an alternative arrangement where a similar actual orifice F˟ of oval shape is positioned in the side wall A of the combustion chamber. The "equivalent" orifice Fᶻ is shown in dotted lines. In this case the "equivalent" orifice has its upstream and downstream edges parallel and lying in planes extending radially from the chamber axis D. The other edges of the "equivalent" orifice run parallel along the inner side wall A of the combustion chamber and lie in planes normal to the axis of the chamber.

In each case the "equivalent" orifice has the following characteristics:—

(1) Its upstream and downstream edges must lie in planes extending radially from the combustion chamber axis, while the other two sides of the "equivalent" orifice are either delineated by concentric circles drawn from the combustion chamber axis or by lines drawn on the inner surface of the combustion chamber wall so that they will lie in planes normal to the combustion chamber axis.

(2) The "equivalent" orifice must have the same area as that of the actual orifice.

(3) The centroid, that is to say the centre of gravity of the area of the "equivalent" orifice must coincide with the centroid of the actual orifice.

(4) The length of the "equivalent" orifice, that is its dimension measured between its upstream and downstream edges, that is circumferentially in relation to the combustion chamber, and the width of this imaginary orifice, that is, its dimension as measured either radially with respect to or in the direction of the combustion chamber axis, must bear the same ratio to each other as the maximum length and breadth of the actual orifice as measured in the same directions.

Experience derived from extensive experiments has shown that in a combustion chamber such as indicated above for an internal combustion engine of the class to which this invention relates, the main combustion should occur near the orifice at the inner or combustion chamber end of the passageway leading from that chamber into the cylinder. These experiments have also demonstrated that more efficient combustion is obtained when the jet end point lies within the above prescribed area in the "floor plane" than when this point lies outside this area. Evidence in support of this is given by the lower fuel consumption, higher maximum output and cleaner exhaust at high loads obtained with the present invention.

What I claim is:

In an internal combustion engine of the liquid fuel injection compression ignition type, the combination with an engine cylinder, of a combustion chamber formed as a pocket which lies outside of but communicates with the cylinder, said pocket being of approximately circular shape in planes transverse to the axis thereof and having end walls the minimum distance between which is at least two-thirds of the mean diameter of the pocket, means affording a passage extending between the cylinder and the combustion chamber pocket, said pocket being formed to provide an orifice in one end wall thereof communicating with the passage, said passage being so formed that the air charge forced therethrough during the compression stroke will enter the pocket in a direction such that the charge in the pocket at the end of the compression stroke will be in a state of rotation as a whole about the axis of the pocket, and a fuel injection device disposed adjacent the other end wall of the combustion chamber pocket at a point displaced a substantial distance radially from the axis of the pocket, said device being constructed and arranged to deliver a jet of fuel in a direction forming an angle with the pocket axis of less than 45°, the axis of the jet intersecting the floor plane of the pocket at a point which lies between radial planes extending from the pocket axis and angularly positioned about that axis by approximately 15° and 135° respectively in a direction measured upstream from the radial plane which passes through the downstream edge of the actual or "equivalent" orifice of the passage, the said point being displaced in a radial direction from the pocket axis by a distance greater than one-third of the mean radius of the circular wall of the pocket.

HARRY RALPH RICARDO.